United States Patent [19]

Habelt

[11] 3,821,816

[45] June 28, 1974

[54] RECORDING AND/OR PLAYBACK APPARATUS

[75] Inventor: Gerhard Habelt, Vienna, Austria

[73] Assignee: U.S. Philips Corporation, New York, N.Y.

[22] Filed: Mar. 8, 1972

[21] Appl. No.: 232,889

[30] Foreign Application Priority Data

Mar. 8, 1971 Austria .............................. 1960/71

[52] U.S. Cl. ......................360/137, 242/198, 360/96

[51] Int. Cl. ............................................ G11b 5/00

[58] Field of Search ............ 274/4 B, 4 C, 4 D, 4 E, 274/4 F; 352/73, 123, 170–172; 242/197–200, 55.19 A

[56] References Cited

UNITED STATES PATENTS

| | | | |
|---|---|---|---|
| 2,943,804 | 7/1960 | Loewe et al. | 242/186 |
| 3,589,733 | 6/1971 | Piotrowski | 274/4 F |
| 3,627,228 | 12/1971 | Wolfe | 242/201 |
| 3,632,896 | 1/1972 | Ban | 179/100.2 B |
| 3,687,397 | 8/1972 | Suzuki et al. | 242/191 |

*Primary Examiner*—Leonard D. Christian
*Attorney, Agent, or Firm*—Frank R. Trifari

[57] ABSTRACT

A recording and/or playback apparatus for a record carrier which is accommodated in a magazine to be placed on the apparatus in an operative position. The apparatus has an indexing device having indicating means, for indicating the relative position of the record carrier, which is capable of being set back to zero. The indicating means of the indexing device is movable against the action of a spring and can be driven via a shaft which revolves simultaneously with the movement of the record carrier and can be set back to the zero position by disengaging a spring-loaded coupling member. A cooperating actuating device is provided for shifting the disengageable member and comprises a first actuating member adapted to be moved in two opposite directions by a magazine being placed in the operative position or being removed from this position, and a cooperating movable second actuating member for disengaging the coupling member. The first actuating member only displaces the second actuating member in the direction required for disengagement of the coupling member during its displacement, which is determined by a magazine being placed in the operative position and then releases it.

5 Claims, 6 Drawing Figures

RECORDING AND/OR PLAYBACK APPARATUS

Figure 1:
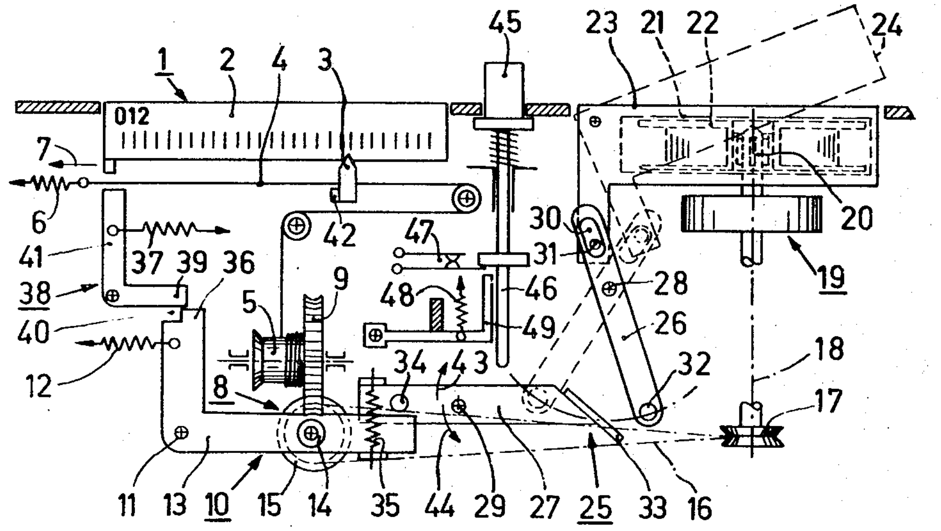

The invention relates to a recording and/or playback apparatus for a record carrier which is accommodated in a magazine to be placed on the apparatus in an operative position, the apparatus has an indexing device which is capable of being set back to zero. The indicating means are movable against the action of a spring, and can be driven via a coupling by a shaft which revolves simultaneously with the movement of the record carrier and can be set back to the zero portion by disengaging a spring-loaded coupling member. For shifting the disengageable coupling member a cooperating actuating device is provided which comprises a first actuating member adapted to be moved in two opposite directions by a magazine being placed in the operative position or being removed from this position, and a cooperating movable second actuating member for disengaging the coupling member. In an apparatus of this type described in German Pat. application laid open to public inspection under No. 1,942,951 the indicating means of the indexing device are set to zero each time a magazine is removed from the operative position in the apparatus, a coupling part provided to drive the indicating means of the indexing device being disengaged, whereupon the indicating means of said device return to zero under the action of a spring.

The present invention is characterized in that the first actuating member only during its displacement which is determined by a magazine being placed in the operative position, also displaces, at least for part of its travel, the second actuating member in the direction required for disengagement of the coupling member and then releases it. These steps have proved to be of advantage for dictating apparatus. The indicating means of the indexing device are set to zero only when a magazine is placed in the operative position, which is of advantage in dictating apparatus, because the last indication of the indexing device is retained until a new operational cycle of the apparatus is actually started.

A preferred embodiment of the apparatus according to the invention is characterized in that a pawl is provided which under the action of a spring snaps in front of the disengaged coupling member and holds it in the disengaged position against the force of the spring acting on this member and, when the indicating means have reached the zero position, can be set back by a projection provided on the indicating means to the position in which it releases the disengaged coupling member. These steps according to the invention ensure that the indicating means of the indexing device are reliably and completely set back to zero irrespective of whether a magazine is slowly or rapidly placed in the operative position, because the disengaged coupling member returns to the engaged operative position only after the indicating means of the indexing device have returned to zero.

In an apparatus which is provided with a magazine holder which is pivotable between two positions in a first of which, to which it has been pivoted away from the apparatus, a magazine can be inserted in the holder, whilst by pivoting the holder to the second position such a magazine can be placed on the apparatus in the operative position, it was found to be of advantage, with a view to simple construction, for the first actuating member to cooperate with the magazine holder.

It was found to be of particular advantage when an operating element is provided which cooperates with one of the two actuating members and which when operated moves this actuating member to a position in which cooperation of the two actuating members is precluded. Such an operating element enables the automatic zero-setting of the indicating means of the indexing device when a magazine is placed in the operative position to be prohibited at will. This is of particular advantage when the user of the apparatus has removed a magazine from the apparatus, intending to place another magazine in the operative position, but then decides as yet to replace the first magazine in the operative position in order to continue to use it, starting from the point at which he stopped recording. In such a case, operation of the aforementioned operating element prevents the indexing device from being set back to zero and causes it to remain in the latest indicating position when the magazine is placed in the operative position so that the indexing device indicates the further use of this magazine without interruption. In this connection it was further found, with a view to simplification of other operating elements of the apparatus, in as far as this apparatus has an operating element (STOP) for switching off the modes of the record carrier, to be advantageous for this operating element to be displaceable along an additional actuating stroke beyond the position in which it switches off the modes of the record carrier, so that in said additional actuating stroke it cooperates with one of the two actuating members in order to prevent cooperation of same. It should be noted that the multiple use of an operating element for setting an apparatus to various functions is known.

The invention will now be described more fully with reference to the accompanying diagrammatic drawings which show some embodiments.

Figure 2:
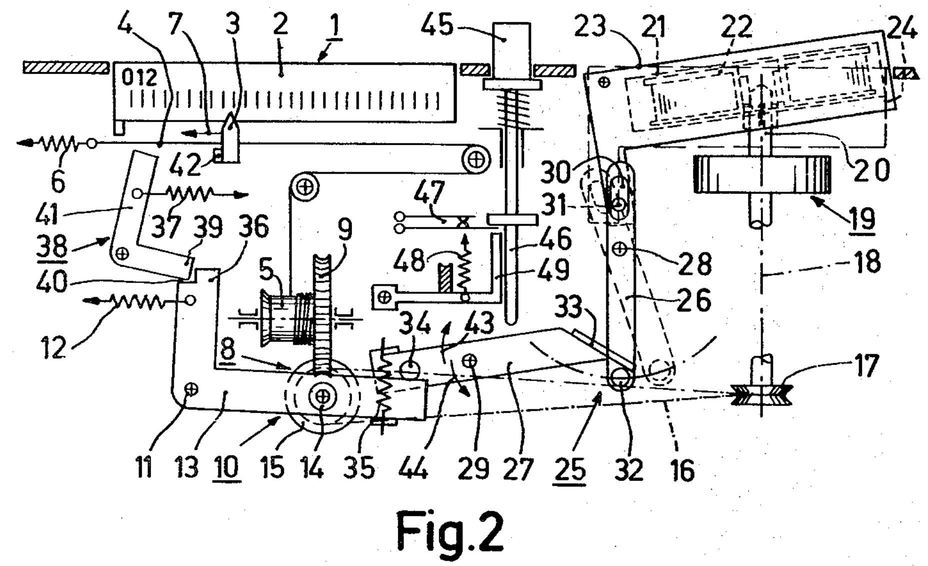

FIGS. 1 and 2 are schematic views which show a first embodiment having an actuating device which is constituted by levers and is actuated by a magazine holder provided on an apparatus, FIG. 1 showing the apparatus with the magazine in operative position and FIG. 2 showing an intermediate position which occurs when a magazine is being moved to the operative position.

Figure 3:
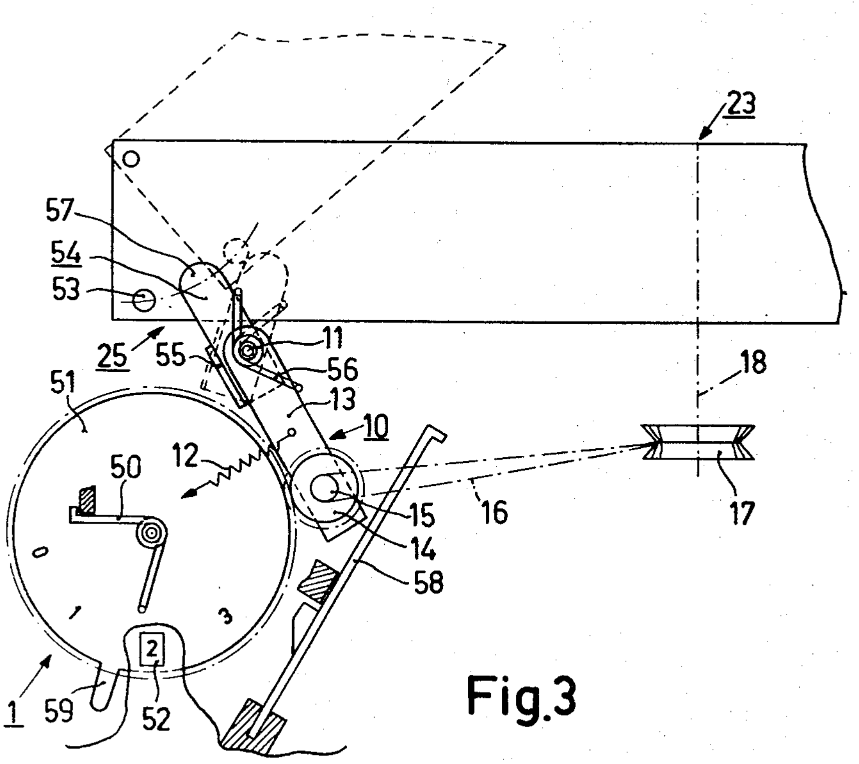
Figure 4:
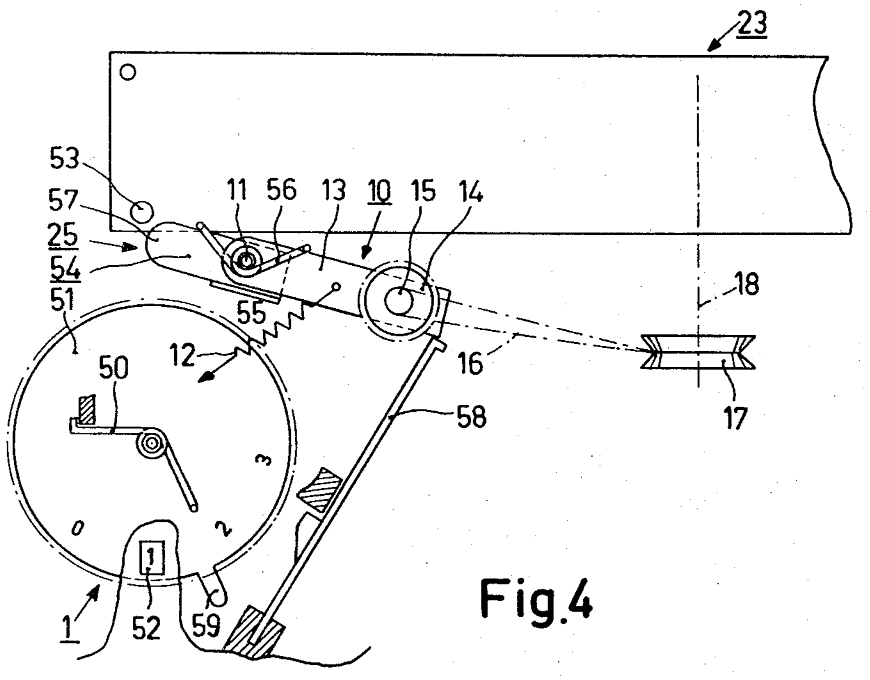

FIGS. 3 and 4 are schematic views which show a second embodiment in which a first actuating member of an actuating device is directly provided on a magazine holder, FIG. 3 showing a situation before a magazine is moved to operative position and FIG. 4 showing a situation after a magazine has been moved to the operating position, however, in the latter case without indicating means of an indexing device having been set to zero.

Figure 5:
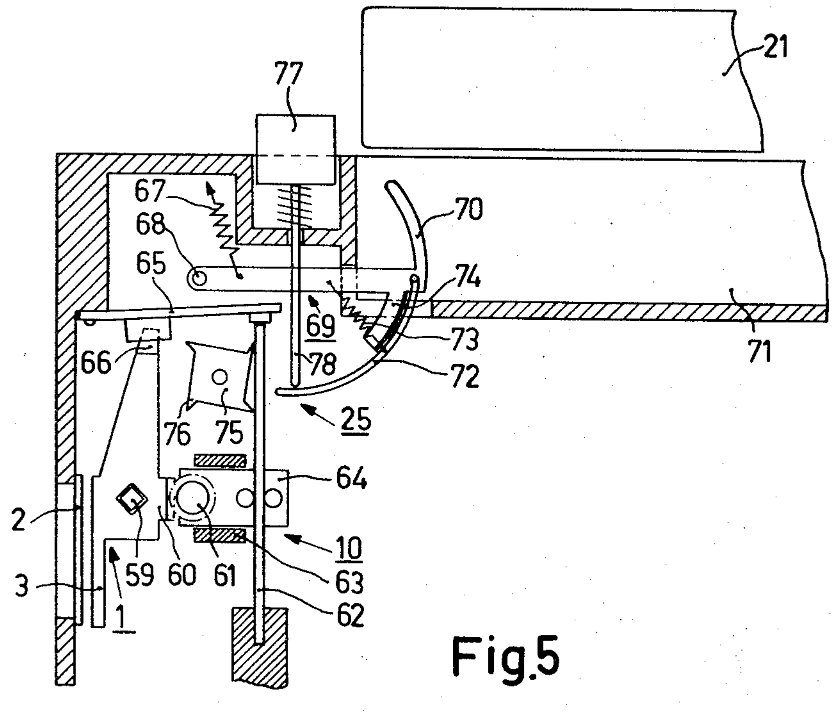
Figure 6:
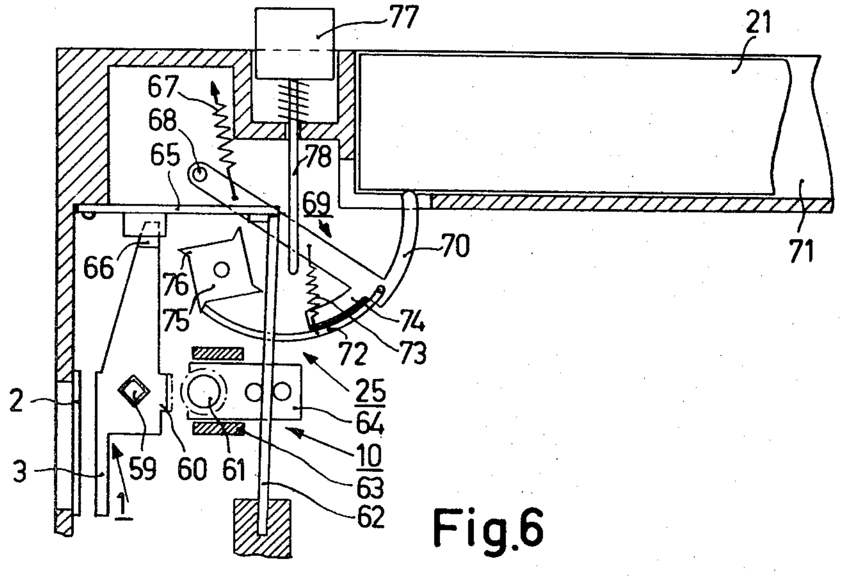

FIGS. 5 and 6 are schematic views which show in the same manner as used in FIGS. 3 and 4 a third embodiment in which an actuating device is constituted by a cam member which can be actuated by a pivotable arm connected to a sensing lever.

Referring now to FIGS. 1 and 2, an indexing device 1 has a graduated indicating scale 2 over which a pointer 3 is movable as an indicating means. This pointer is connected to a cord 4 one end of which is secured to a take-up drum 5 and the other end of which is attached to a tension spring 6 which tends to move the pointer, in the direction indicated by an arrow 7, to the zero position. The pointer is driven in accordance with the movement of a record carrier via a coupling 8 which comprises a gear-wheel 9 secured to the take-up drum 5 and a disengageable coupling member 10 in the form of a lever 13 which is pivotable about a pin 11 and is controlled by a spring 12 and on which a worm 14 provided for cooperation with the wheel 9 is rotatably mounted. The spring 12 ensures that the worm 14 meshes with the wheel 9. The worm 14 is secured to a wheel 15 from which a cord 16 runs to a wheel 17 which is mounted on a shaft 18 of a take-up device 19 of the apparatus. This take-up device has a winding spindle 20 which, when a magazine 21 is in operative position on the apparatus, co-operates with a spool 22 for a record carrier accommodated in the magazine. Thus simultaneously with the winding of the record carrier on the spool 22 the pointer 3 of the indexing device is moved over the scale 2.

When the coupling member 10 is pivoted against the action of the spring 12 by means of an actuating device, the worm 14 is disengaged from the wheel 9. Thus the wheel 9 is freely rotatable and the spring 6 is enabled to move the cord in the direction indicated by the arrow 7 until the pointer 3 has reached the zero position, which is determined by a stop or the like.

In this embodiment a magazine may be moved to its operative position on the apparatus by means of a magazine holder 23 which is arranged on the apparatus so as to be pivotable between two positions. In a first position of this holder, which it assumes after being pivoted away from the apparatus, as shown in broken lines in FIG. 1, a magazine may be inserted, for example with one of its minor surfaces to the front, in an opening formed in a wall 24 of the holder. By pivoting the holder to the second position shown by solid lines in FIG. 1 a magazine inserted in the holder can be moved to operative position on the apparatus.

For setting the indicating means of the indexing device to zero an actuating device 25 is provided which comprises a first actuating member 26, which is adapted to be moved in one direction when a magazine is placed in the operative position and in the opposite direction when the magazine is removed from this position, and a co-operating second actuating member 27 which is adapted to be moved to disengage the coupling member 10. The two actuating members 26 and 27 each comprise a lever adapted to pivot about a pin 28 and 29 respectively. At one end the lever 26 is provided with a slot 30 into which projects a pin 31 provided on the magazine holder 23. At its other end the lever 26 has a projection 32 arranged to co-operate with an inclined plane 33 arranged at one end of the lever 27. At the end remote from the inclined plane 33 the lever carries a projection 34 which co-operates with the lever 13 of the disengageable coupling member, a tension spring 35 arranged between the lever 27 and the lever 13 causing the two levers to be relatively tensioned. The free end 36 of the lever 13 co-operates with a pivotable pawl 38 which is loaded by a spring 37 and in the engaged condition of the coupling member freely engages the end 36 of the lever 13 with its free end 39 but in the disengaged condition of the coupling member snaps with its end 39 in a recess 40 in the lever 13 and thereby holds the coupling member in its disengaged position. To enable the pawl 38 to be set back to a position in which it releases the coupling member the pawl has an arm 41 the free end of which extends into the path of the pointer 3 at a location through which a projection 42 provided on the pointer travels shortly before the pointer reaches its zero position, in which case the pawl is pivoted by the projection against the action of the spring 37 to an extent such as to release the lever 13.

The operation of the apparatus will now be described more fully. The description starts from the operational situation shown in FIG. 1 in which a magazine is disposed on the apparatus so as to be ready for operation, a record carrier accommodated in the magazine having been moved for a length indicated by the indexing device. When this magazine disposed in the operative position on the apparatus is to be removed therefrom, the holder 23 is raised to the position shown in broken lines in FIG. 1. In this position of the holder the magazine may be removed from the holder and replaced by another. During this pivotable movement of the holder the lever 26 of the actuating device 25 is caused to follow this movement by the pin 31, the projection 32 on the lever engaging a major surface of the inclined plane 33 so as to move the lever 27 in the direction indicated by an arrow 43 against the action of the spring 35, until the projection 32 becomes disengaged from the inclined plane, whereupon the lever returns to its initial position. As will be seen, the lever 26 for part of its travel drives the lever 27 but then releases it again. During this operation the coupling member 10 remains in its initial position, i.e., in the engaged condition, in particular owing to the spring 12, so that the pointer 3 of the indexing device is not set back to zero during the aforedescribed pivotal movement of the magazine holder.

When the magazine holder is pivoted towards the apparatus, that is when a magazine is brought into the operative position, the lever 26 of the actuating device 25 is pivoted in the opposite direction, its projection 32 again engaging the inclined plane 33, but now at the other major surface so that the lever 27 is pivoted in the direction indicated by an arrow 44. During this pivotal movement the lever 13 of the disengageable coupling member is driven via the stop 34, the worm 14 becoming disengaged from the wheel 9. The end 39 of the pawl 38 snaps into the recess 40 in the lever 13. This situation is shown in FIG. 2. On further pivotal movement of the magazine holder the pin 32 will again be disengaged from the inclined plane so that the lever 27, which for part of the travel of the lever 26 was moved by this lever, is again released by the lever 26. Upon this release, however, the disengaged coupling member now does not return to its initial position, because it is restrained by the pawl 38. From the instant at which the worm 14 is disengaged from the wheel 9 the pointer 3 is set back to zero under the action of the spring 6. When the pointer 3 reaches the zero position the stop 42 moves the pawl 38 so that it releases the disengaged coupling member which then returns to its initial position in which the worm 14 meshes with the wheel 9, permitting the indexing device to be driven again.

If the pointer should have reached the zero portion before the pin 32 releases the lever 27, the disengaged coupling member 10 immediately after this release will return to its initial position, because in this case the pawl 38 has already been set back.

As will be appreciated, this arrangement ensures that the indicating means of the indexing device actually are returned to zero only when a magazine is placed in its operative position on the apparatus, care being taken to ensure that irrespective of the time required for bringing a magazine to the operative position the indicating means of the indexing device are always completely reset before the coupling of the indexing device is brought into readiness for operation, so that under all operating conditions the indexing device is set back to zero with certainty.

The embodiment shown in FIGS. 1 and 2 further includes an operating element 45 the actuating rod 46 of which cooperates with the actuating member 27 on operation of this element so that the actuating member 27 is moved sufficiently in the direction indicated by the arrow 43 that the inclined plane 33 is removed from the path of the projection 32 of the actuating emember 26, with the result that the actuating members 26 and 27 can no longer cooperate. Such movement of the actuating member 27 does not influence the coupling member 10, so that this remains in its engaged condition. Thus, by operating the element 45 during the movement of a magazine to its operative position the compulsory resetting to zero of the indicating means of the indexing device may be cancelled, since in this case the projection 32 on the lever 26 cannot engage the inclined plane 33 on the lever 27, because the inclined plane 33 will be located outside the path along which the projection 32 travels.

The aforedescribed steps enable a user of the apparatus to continue recording on, or playing back from, a magazine which, for example, he may have removed from the operative position, whilst retaining the last indication of the indexing device when he brings the magazine into the operative position in the apparatus again. Especially for dictating apparatus this may be of great advantage, for example when the user, after having removed the magazine from the operative position, decides to make an addition to, or a correction in, a finished dictation.

In the embodiment described the operating element 45 also serves as the element for switching off the modes of movement of the record carrier, with a consequent simplification of the operating elements of the apparatus. To stop the movement of the record carrier the actuating rod 46 operates a switch 47 via which the relevant switching commands are transmitted in a manner not shown. Reaching this switch position is marked by a perceptible braking which is provided by an abutment member loaded by a spring 48. At this braking instant the actuating rod 46 does not yet operate the lever 27. Only when the operating element is moved beyond this switch position which produces stopping of the movement of the record carrier, the actuating rod 46 is caused to cooperate with the actuating member 27 during its further movement. Thus the two functions of the operating element may simply be distinguished from one another.

With a suitable design of the actuating device the operating element 45 may also cooperate with the other actuating member 26. An essential requirement then is that either the cooperation of the two actuating members 26 and 27 with one another or the cooperation of the actuating member 27 with the disengageable coupling member or the movement of the actuating member 26 when a magazine is placed in the operative position may, if desired, be inhibited.

In the embodiment shown in FIGS. 3 and 4 the indicating means of the indexing device 1 comprise a disk 51 which is rotatable against the action of a torsion spring 50, a window 52 enabling the indexing device to be read. The disk 51 is again driven via a disengageable coupling member 10 the driving wheel 14 of which cooperates with circumferential teeth of the wheel 51.

The first actuating member of the actuating device 25 here is a pin 53 provided on the magazine holder 23. The second actuating member of the actuating device is a lever 54 which has the same pivot point 11 as the lever 13 of the disengageable coupling member 10. The lever 54 has a projection 55 which cooperates with the lever 13, a spring 56 tensioning the two levers with respect to one another. The free end 57 of the lever 54 extends into the path along which the pin 53 travels so that, when the magazine holder is raised, for part of the travel of the pin 53 the lever 54 only is moved (as is shown in broken lines in FIG. 3), whilst when the magazine holder is lowered on to the apparatus the cooperation of the projection 55 with the lever 13 causes both the lever 54 and the lever 13 to be pivoted. In the latter case another pawl, which here takes the form of an biassed leaf spring 58, holds the disengaged coupling member (see FIG. 4) until the indicating means of the indexing device have reached the zero position, in which case a projection 59 provided on the indicating means moves the pawl a distance such that the disengaged coupling member 10 is released, whereupon this member returns to the engaged operative condition under the action of the spring 12.

In the embodiment shown in FIGS. 5 and 6 the indexing device 1 comprises a pointer 3 adapted to be displaced along a guide rod 59 which has a rack part 60 which cooperates with a worm spindle 61 which is adapted to be driven in synchronism with the movement of the record carrier. This worm spindle forms part of the disengageable coupling member 10, which further comprises a leaf spring 62 which is fixed at one end and is coupled for a positive driving connection to a support 64 which is slidable in a guide 63 and on which the worm spindle is rotatably mounted. Deflection of the leaf spring from its rest position shown in FIG. 5 enables the disengageable coupling member 10 to be shifted, that is the coupling may be disconnected, whereupon the pointer returns to its zero position under the action of a spring. After the coupling has been disconnected a pawl 65 in the form of a leaf spring ensures that the disengaged coupling member 10 is held in the disengaged position until the pointer has reached its zero position, whereupon an inclined plane 66 provided on the pointer lifts the pawl to an extent such that it releases the leaf spring 62 of the disengageable coupling member.

A lever 69 which is arranged to pivot about a pin 68 against the action of a spring 67 forms the first actuating member of the actuating device. This lever 69 has an arm 70 which serves as a feeler and projects into a recess 71 in the apparatus in which a magazine 21 may be placed, which then is in the operative position. The lever 69 further carries a pivotable arm 72 which under the action of a spring 73 engages a stop 74 formed on the lever 69.

The second actuating member of the actuating device 25 is a freely rotatable cam disk 75 which has four cams 76 distributed around the circumference. When the coupling member 10 is engaged, the leaf spring 62 engages two cams 76, thereby determining the position of the cam disk.

The arm 72 of the lever 69 and the cam disk 75 are so arranged relative to one another that the arm 72, when it is moved together with the feeler 70 by a magazine being inserted into the recess 71, engages the cam disk between two cams, causing this disk to rotate in the clockwise direction. During such a rotation one of the cams deflects the leaf spring 62 so that the support 64 is displaced and the worm spindle 61 is moved out of engagement with the rack part 60 of the pointer 3. Whilst the pointer is returning to its zero position the pawl 65 holds the leaf spring 62 in its deflected position, as is shown in FIG. 6. When the pointer reaches its zero position the inclined plane 66 lifts the pawl 65 so that the leaf spring 62 is released, permitting it to return to its initial position. The leaf spring 62 also rotates the cam disk 75 through an angle such that the spring engages two cams. During this rotation of the cam disk the cam which was the last to cooperate with the arm 72 of the lever 69 is lifted from this arm 72, and the next cam moves into a position in which it lies in the path along which the arm 72 travels, again enabling the arm 72 to co-operate with the cam disk. As long as the magazine placed on the apparatus remains in its operative position, the lever 69 and hence its arm 72 remain in the positions shown in FIG. 6. Only when the magazine is removed from the operative position, the lever 69 returns to its operative position shown in FIG. 5, the arm 72 being pivoted against the action of the spring 73 so as to slidingly pass over the cam disposed in its path, without the cam disk itself being rotated, since its position in this case is determined by the leaf spring 62.

In this embodiment a special operating element 77 is provided the actuating rod 78 of which enables the arm 72 of the lever 69 to be pivoted to an extent such as to prevent it from cooperating with the cam disk 75. Thus, if desired, the pointer may again be prevented from being set back to the zero position when a magazine is placed in the operative position.

Obviously, the embodiments described may be modified in many respects without departing from the scope of the invention. This applies in particular to the design of the actuating device and its cooperation with the disengageable coupling member and to the manner in which it is actuated when a magazine is placed in the operative position.

What is claimed is:

1. A recording and/or playback apparatus for a record carrier accommodated in a magazine comprising a magazine holder movably mounted on said apparatus for receiving said magazine and movement between a loading position and an operative position, an indexing device having movable indicating means for indicating the relative position of said record carrier, spring means for urging said indicating means toward a zero indication, drive means coupling said indicator to the movement of said record carrier so as to drive the indicator against the urging of said spring means simultaneously with the movement of said record carrier, said drive means having a disengagable coupling member for disconnecting said drive means, means connected to said coupling member for biasing said drive means toward a connected position, an actuating device arranged for cooperative engagement with said coupling member so as to cause disconnection of said drive means thereby permitting said indicator to be set back to zero under the influence of said spring means, said actuating device comprising a first actuating member movable in a first direction by said holder upon movement thereof to the operative position and in a second direction by said holder upon movement thereof to the loading position, and a second movable actuating member cooperating with said first actuating member for disconnecting said drive means, said second actuating member being displaced in a direction for disconnecting said drive means to allow said indicator to move back to zero only upon movement of said first actuating member in said first direction, said second actuating member being then released for reconnection of said drive means.

2. A recording and/or playback apparatus for a record carrier accommodated in a magazine comprising a magazine holder movably mounted on said apparatus for receiving said magazine and movement between a loading position and an operative position, an indexing device having movable indicating means for indicating the relative position of said record carrier, spring means for urging said indicating means toward a zero indication, drive means coupling said indicator to the movement of said record carrier so as to drive the indicator against the urging of said spring means simultaneously with the movement of said record carrier, said drive means having a disengagable coupling member for disconnecting said drive means, means connected to said coupling member for biasing said drive means toward a connected position, an actuating devie arranged for cooperative engagement with said coupling member so as to cause disconnection of said drive means thereby permitting said indicator to be set back to zero under the influence of said spring means, said actuating device comprising a first actuating member movable in a first direction by said holder upon movement thereof to the operative position and in a second direction by said holder upon movement thereof to the loading position, and a second movable actuating member cooperating with said first actuating member for disconnecting said drive means, said second actuating member being displaced in a direction for disconnecting said drive means to allow said indicator to move back to zero only upon movement of said first actuating member in said first direction, said second actuating member being then released for reconnection of said drive means, and a pawl movably mounted on said apparatus, a spring connected to said pawl for urging said pawl in the path of movement of said coupling member holding said coupling member in the disconnected position of said drive means, and projection means on said indicator for engagement with said pawl when said indicator is at the zero position so as to remove said pawl from said path allowing said coupling member to return said drive means to the connected position under the influence of said biasing means.

3. A recording and/or playback apparatus for a record carrier accommodated in a magazine comprising a magazine holder movably mounted on said apparatus for receiving said magazine and movement between a loading position and an operative position, an indexing device having movable indicating means for indicating the relative position of said record carrier, spring means for urging said indicating means toward a zero indication, drive means coupling said indicator to the movement of said record carrier so as to drive the indicator against the urging of said spring means simultaneously with the movement of said record carrier, said drive means having a disengagable coupling member for disconnecting said drive means, means connected to said coupling member for biasing said drive means toward a connected position, an actuating device arranged for cooperative engagement with said coupling member so as to cause disconnection of said drive means thereby permitting said indicator to be set back to zero under the influence of said spring means, said actuating device comprising a first actuating member movable in a first direction by said holder upon movement thereof to the operative position and in a second direction by said holder upon movement thereof to the loading position, and a second movable actuating member cooperating with said first actuating member for disconnecting said drive means, said second actuating member being displaced in a direction for disconnecting said drive means to allow said indicator to move back to zero only upon movement of said first actuating member in said first direction, said second actuating member being then released for reconnection of said drive means, and said first actuating member cooperating with said holder.

4. A recording and/or playback apparatus for a record carrier accommodated in a magazine comprising a magazine holder movably mounted on said apparatus for receiving said magazine and movement between a loading position and an operative position, an indexing device having movable indicating means for indicating the relative position of said record carrier, spring means for urging said indicating means toward a zero indication, drive means coupling said indicator to the movement of said record carrier so as to drive the indicator against the urging of said spring means simultaneously with the movement of said record carrier, said drive means having a disengagable coupling member for disconnecting said drive means, means connected to said coupling member for biasing said drive means toward a connected position, an actuating device arranged for cooperative engagement with said coupling member so as to cause disconnection of said drive means thereby permitting said indicator to be set back to zero under the influence of said spring means, said actuating device comprising a first actuating member movable in a first direction by said holder upon movement thereof to the operative position and in a second direction by said holder upon movement thereof to the loading position, and a second movable actuating member cooperating with said first actuating member for disconnecting said drive means, said second actuating member being displaced in a direction for disconnecting said drive means to allow said indicator to move back to zero only upon movement of said first actuating member in said first direction, said second actuating member being then released for reconnection of said drive means, and a movably mounted operating element arranged for cooperation with one of said actuating members so as to prevent cooperation between said first and second actuating members.

5. A recording and/or playback apparatus for a record carrier accommodated in a magazine comprising a magazine holder movably mounted on said apparatus for receiving said magazine and movement between a loading position and an operative position, an indexing device having movable indicating means for indicating the relative position of said record carrier, spring means for urging said indicating means toward a zero indication, drive means coupling said indicator to the movement of said record carrier so as to drive the indicator against the urging of said spring means simultaneously with the movement of said record carrier, said drive means having a disengagable coupling member for disconnecting said drive means, means connected to said coupling member for biasing said drive means toward a connected position, an actuating device arranged for cooperative engagement with said coupling member so as to cause disconnection of said drive means thereby permitting said indicator to be set back to zero under the influence of said spring means, said actuating device comprising a first actuating member movable in a first direction by said holder upon movement thereof to the operative position and in a second direction by said holder upon movement thereof to the loading position, and a second movable actuating member cooperating with said first actuating member for disconnecting said drive means, said second actuating member being displaced in a direction for disconnecting said drive means to allow said indicator to move back to zero only upon movement of said first actuating member in said first direction, said second actuating member being then released for reconnection of said drive means, and a movably mounted operating element displaceable to a first position for switching off the modes of movement of the record carrier, and displaceable to a second position beyond said first position for cooperation with one of said actuating members for preventing cooperation between said first and second actuating members.

* * * * *